Patented Aug. 13, 1935

2,011,041

UNITED STATES PATENT OFFICE 2,011,041

WOOD FILLER

Henry Alfred De Phillips, Philadelphia, Pa.

No Drawing. Application September 16, 1931,
Serial No. 563,234

9 Claims. (Cl. 134—49)

This invention relates to materials for filling the grain of wood preparatory to the coating thereof with the usual surface dressings such as varnish, lacquer and the like.

It has heretofore been proposed to employ oil and water stains and fillers to close the pores of the wood preparatory to the coating operations. The difficulty with such fillers has been that the filled article must remain untouched for a long period of time before wiping off the excess of filler and coating. This period of time requires either a large floor space in which the article must be stored during the setting of the filler, or ovens to accelerate the drying of the filler, and also the greater time interval permits dust and the like to gather upon the filled surface. Even after the filled wood has been rubbed to remove excess filler, a further period of time must elapse before the filler has hardened sufficiently to permit the application of the coatings.

Furthermore, various fillers have difficulties associated with their use such as the fact that they do not wipe clean, they are not highly resistant to the action of water or weather, they shrink in setting or during the course of time, they do not adhere properly to the wood or provide a proper adhesive surface for the later-applied coatings, and they cannot be baked.

According to the present invention, a type of filler is set forth which combines, with quick setting, the great advantages of high resistance to ultraviolet light and water, the presentation of excellent adhesive surfaces for the further coatings and being itself strongly adherent to the wood fibers, and of not being subject to "graying out" in use nor shrinkage, and of being easily cleaned or wiped, and even permitting baking.

The material is preferably so compounded that it is distributed and sold as a concentrated material which may be immediately employed as a putty or glaze, but which may be easily diluted to a more liquid condition for employment as a filler and/or stain.

The base of such material is one of those synthetic resins which have the power of releasing their solvents rapidly when in solution, in contrast for example to the action of a slow setting resin solution which dries superficially with a film which is non-permeable to the solvents, so that the solvents are trapped beneath this surface film and thus maintain the film tacky for an extended period of time. The material is preferably one of the water-insoluble resin-like materials belonging to the poly-styrols, glyceride phthalic anhydrides, phenol formaldehydes, and the modified resins of such types, or like condensed organic substances of the fatty acid ester type having the structure of a ketone group associated with two aromatic nuclei which themselves are associated with carboxyl groups, in the condensation of which the hydroxyl preferably has reacted at least in part with a polyhydric alcohol radical. Such are described in the Bruson Patents 1,813,838 and 1,807,503. An especially preferred material may be produced by oxidizing tolyl-ortho-benzoic acid by an alkaline permanganate solution, and heating the product, with agitation in an inert atmosphere at just above the melting point, in contact with a polyhydric alcohol such as glycerol, an ethylene or like glycol, or mannitol, etc., and if desired with a fatty acid and/or oily material such as raw or boiled linseed oil, castor oil, olive oil, fish oil, or tallow; oleic, linoleic, ricinoleic, stearic, palmitic, elaeo-stearic acids, or in general the acids produced by hydrolysis of vegetable and animal oils. Such materials are quick-drying synthetic resins.

Various formulas may be employed according to the character of the material to be treated and the later coating to be applied, and the color, time, or other conditions of the operation. A preferred formula is the following:

| | Grams |
|---|---|
| Powdery mass of fibrous inorganic material | 170 |
| Gypsum or silex powder | 1248 |
| Linseed oil | 100 |
| Lead-manganese japan drier | 10 |
| Water | 60 |
| Linseed oil soap | 18 |
| Condensation product of benzo-phenone-dicarboxylic acid (50% by weight in xylol or toluol) | 288 |
| Xylol (as thinner) around | 250 |

This material is a stiff paste which may be employed as a putty or glaze: and which may be distributed in the trade in this concentrated condition. When it is to be employed as a wood filler, it may be diluted in the ratio of 10 to 12 pounds of the above paste to one gallon of a volatile high-boiling petroleum distillate, being about equal parts by volume.

This material upon dilution is applied to the wood surface in the usual manner. It loses its tackiness in about three to four minutes, and should be wiped within ten minutes from the time of application. It is then permitted to dry for about fifty minutes and is then ready for the final coating, such as shellac, lacquer, or varnishes of various kinds. In other words, the wood can be filled and made ready for employment within one hour.

The powdery mass of fibrous inorganic material is a finely divided suspensible material: in practice, I have used a substantially anhydrous substance which is available commerically and contains 79% of magnesium aluminum silicate, 19% of calcium carbonate, 0.7% of combined water and around 1.3% of moisture. It is employed in conjunction with the gypsum or silex as the filling agent, and appears to reduce any tendency toward settling of this filling material. The benzophenone-dicarboxylic acid condensation product is the binding agent. The soap is used as an emulsifying agent to aid suspension, and may be replaced by another emulsifying agent such as triethanolamine. The linseed oil (treated or raw) appears to extend the condensation product used, as well as to facilitate the cleaning away of excess filler: it appears to form a superficial film during the drying of the solvent materials and thus delay the quickness of escape of the solvents, and hence the quantity employed is selected to give the desired drying time: and may be replaced by another slow-drying oil. The drier is used as a catalyzer to accelerate setting of the linseed oil remaining after wiping.

This material, employed as a wood filler, leaves the natural color of the wood substantially unchanged or "natural". By adding to the material of the preferred composition above approximately 170 grams of Van Dyke brown and 28 grams of burnt sienna, a walnut color is produced. The material may then be employed as a combined filler and stain, and thus further reduced the time required for the passage of wood products through the paint and staining rooms. To produce a walnut color on red gum wood, approximately 70 grams of drop black may be added to the preferred composition above.

As a further instance of simple modification of the above formula, it is possible to add approximately 64 grams of stearic acid or like high-boiling aliphatic acid which operates somewhat like the linseed oil; the time of drying is somewhat slowed down by the film-forming action of the stearic acid to further limit the drying. Further, by adjusting the solvent employed for the resin, and the proportions of oil and other retardant, a filler can be made which can be wiped in a greater or lesser time. By employing a quick-drying synthetic resin such as benzophenone-dicarboxylic acid condensation product with glycerol, dissolved in benzol, with silex and a powdery mass of fibrous inorganic material as a filler, it is possible to fill the surfaces of wood articles and wipe at the end of a minute's time. The filler will then dry sufficiently in five minutes for the application of a final coating of lacquer. From this substantially minimum time, it is possible to prolong the wiping and drying times as desired by the employment of a suitable quantity of retardant such as oil, a high-boiling acid or like material.

The following limits of proportion may be indicated with respect to such ingredients employable:

| | Grams |
|---|---|
| Powdery mass of fibrous inorganic material | 150 to 200 |
| Gypsum or silex | 750 to 1250 |
| Linseed oil | 0 to 144 |
| Japan drier | 0 to 18 |
| Water | 0 to 100 |
| Linseed oil soap | 0 to 50 |
| 50% solution of condensation product of benzophenone-dicarboxylic acid | 288 |
| Xylol as required to adjust viscosity for graining. | |

Petroleum distillate—quantity necessary to thin to proper consistency.

The various ingredients may be incorporated one with another and subjected to a single grinding operation. The material is then packed in sealed container and is ready for shipment.

It is obvious that the invention is not limited solely to the forms of practice set forth, but that it may be employed in many ways within the scope of the appended claims.

What is claimed:—

1. A quick-drying wood filler comprising a suspension of a fine powder filling agent having the properties of silex in an emulsion comprising a resin-like fatty-acid-ester condensation product of benzophenone dicarboxylic acid with a polyhydric alcohol dissolved in a volatile organic solvent having the properties of xylol of being a solvent for the condensation product and of being quickly released thereby during drying, said solvent being emulsified with water, a slow-drying oil, and an emulsifying agent.

2. A filler as in claim 1, with which is incorporated a powdery mass of fibrous inorganic material to reduce the tendency of the filling agent to settle.

3. A wood filler as in claim 1, with which is incorporated a drying agent as a catalyzer to accelerate the setting of the slow-drying oil.

4. A wood filler as in claim 1, with which is incorporated a high-boiling aliphatic acid to retard the evaporation of the organic solvent.

5. A quick-drying wood filler paste comprising by weight 144 parts of a polyhydric-alcohol condensation product of benzophenone dicarboxylic acid dissolved in an aromatic solvent having the property of xylol of being quickly released by said condensation product during drying, 150 to 200 parts of powdery mass of fibrous inorganic material, 750 to 1250 parts of a filling agent having the properties of gypsum and silex powders, not exceeding 144 parts of linseed oil with not exceeding 18 parts of japan drier, and not exceeding 100 parts of water with not exceeding 50 parts of an emulsifying agent having the properties of linseed oil soap.

6. A quick-drying wood filler paste comprising by weight 144 parts of a polyhydric-alcohol condensation product of benzophenone dicarboxylic acid dissolved in an aromatic solvent having the property of xylol of being quickly released by said condensation product during drying, 170 parts of powdery mass of fibrous inorganic material, 1248 parts of a filling agent having the properties of gypsum and silex powders, 100 parts of linseed oil, 10 parts of japan drier, 60 parts of water, and 18 parts of linseed soap.

7. A liquid wood filler comprising a paste according to claim 5 diluted with equal parts by volume of a volatile petroleum distillate.

8. A quick-drying wood filler comprising a resin-like fatty-acid-ester condensation product of a polyhydric alcohol with a benzophenone dicarboxylic acid, a fine powder inorganic filling agent, a slow drying oil, an emulsifying agent, a catalyzer for facilitating the setting of the oil, a solvent for said condensation product having the property of xylol of being quickly released thereby during drying, and a volatile thinning agent for said solvent.

9. A quick-drying wood filler comprising a water-insoluble, quick-drying synthetic resin condensation product of benzophenone dicarboxylic acid with a polyhydric alcohol, a volatile organic solvent having the properties of xylol of being a solvent for said synthetic resin and of being quickly released thereby during drying, a fine powder filling agent, water, a slow-drying oil for forming a superficial film to retard the evaporation of said solvent, a drying agent for accelerating the quick setting of said oil, and an emulsifying agent for the solvent, water and oil.

HENRY ALFRED DE PHILLIPS.